United States Patent
Bertolini

(10) Patent No.: US 7,918,330 B2
(45) Date of Patent: Apr. 5, 2011

(54) MADE TO A GRAIN CONVEYOR

(76) Inventor: Dionisio Bertolini, Castro (BR)

( * ) Notice: Subject to any disclaimer, the term of this patent is extended or adjusted under 35 U.S.C. 154(b) by 23 days.

(21) Appl. No.: 12/192,964

(22) Filed: Aug. 15, 2008

(65) Prior Publication Data

US 2009/0266680 A1 Oct. 29, 2009

(30) Foreign Application Priority Data

Apr. 29, 2008 (BR) .................................. 8801337 U

(51) Int. Cl.
*B65G 19/00* (2006.01)
(52) U.S. Cl. ........................................ 198/716; 198/728
(58) Field of Classification Search .................. 198/716, 198/728–733
See application file for complete search history.

(56) References Cited

U.S. PATENT DOCUMENTS

| | | | | | |
|---|---|---|---|---|---|
| 2,245,073 | A | * | 6/1941 | Hapman ........................ | 198/716 |
| 2,438,083 | A | * | 3/1948 | Whitney ........................ | 198/629 |
| 2,678,664 | A | * | 5/1954 | Bortner ........................ | 285/124.1 |
| 2,922,511 | A | * | 1/1960 | Ruppe ........................ | 198/730 |
| 3,722,664 | A | * | 3/1973 | Hart et al. ........................ | 198/716 |
| 3,889,799 | A | * | 6/1975 | Pirovano ........................ | 198/717 |
| 4,890,723 | A | * | 1/1990 | Debuisson et al. ........... | 198/716 |
| 5,383,547 | A | * | 1/1995 | Noda ............................ | 198/728 |
| 5,865,296 | A | * | 2/1999 | Angus ........................... | 198/716 |
| 6,276,517 | B1 | * | 8/2001 | Peterson et al. .............. | 198/716 |
| 2007/0170043 | A1 | * | 7/2007 | Raijmakers ................... | 198/805 |

* cited by examiner

*Primary Examiner* — Mark A Deuble
(74) *Attorney, Agent, or Firm* — Furr Law Firm; Jeffrey Furr, Esq.

(57) ABSTRACT

This report for Utility Model refers to an improvement introduced in the configuration of drag plates sets installed in a conveyor of the redler type, in a closed circuit circular duct, used for transportation of bulk products, more specifically, for handling vegetable grains and agriculture seeds, such as soy, corn, wheat, rice, oats, barley, coffee and other products. Its major application is for drying and warehousing facilities for grains, which use vertical circular silos, bulk warehouses and also other handling processes employed by agricultural properties, cooperatives, agro-industries and similar industrial facilities. It comprises an innovative replacement of plates of the "U" type currently used, which do not allow the reversing of the change of direction. This improvement to the conveyor corresponds to a new characteristic drawing of the drag plate (8) and respective attachment (9) to the chain, which allows reverting the change of direction of the conveyor chain (1) enabling the sprocket wheel (4) to be used on both sides of said chain along the extension of the circuit. This characteristic allows performance of the conveyor with more flexible configurations as its major benefit, and further reduces the quantity of material used to manufacture the drag plates.

5 Claims, 5 Drawing Sheets

Figure 7:
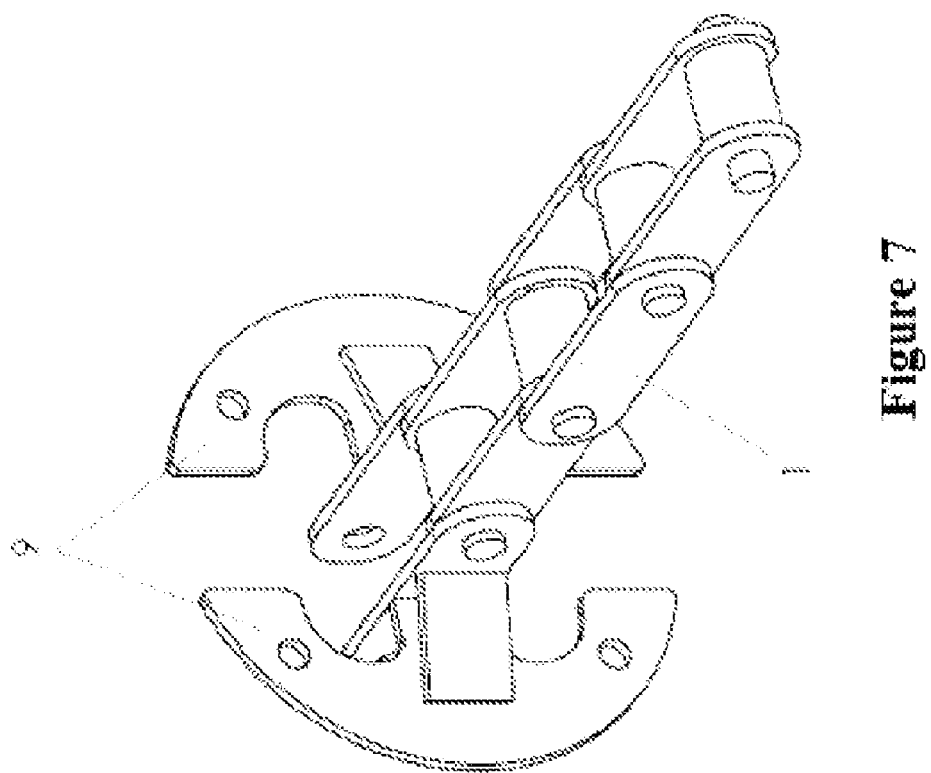

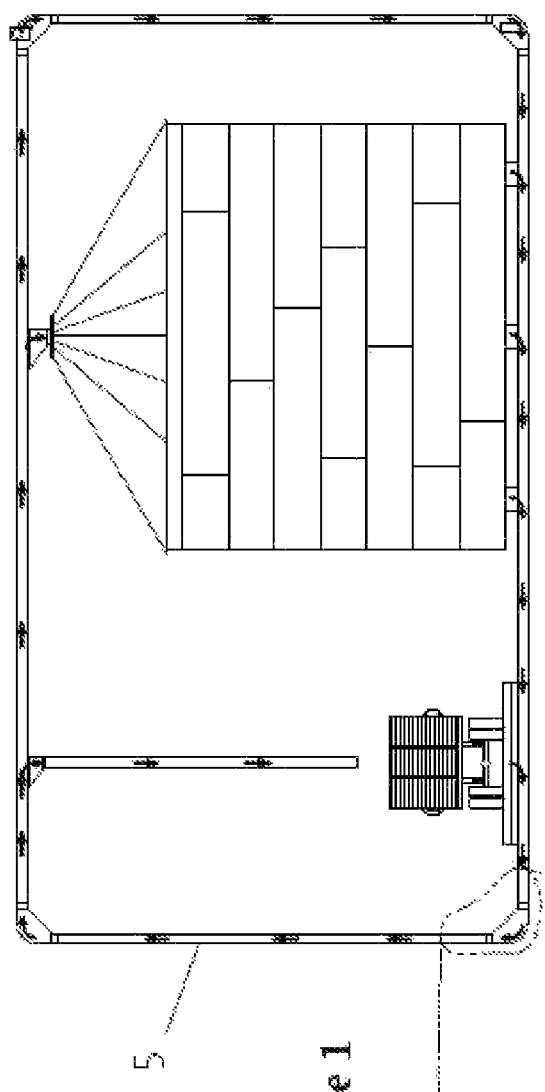
Figure 1
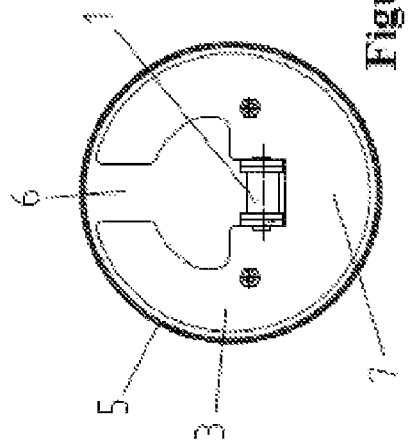
Figure 2
Prior Art
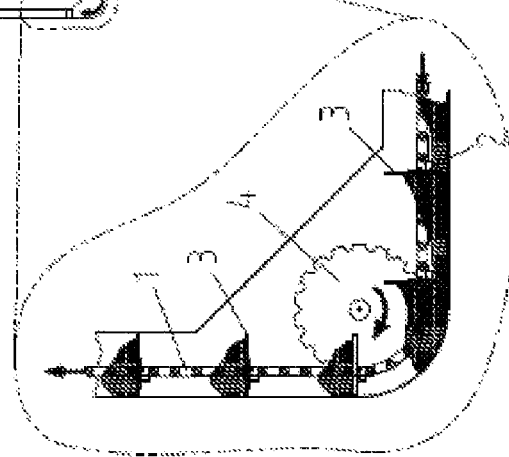

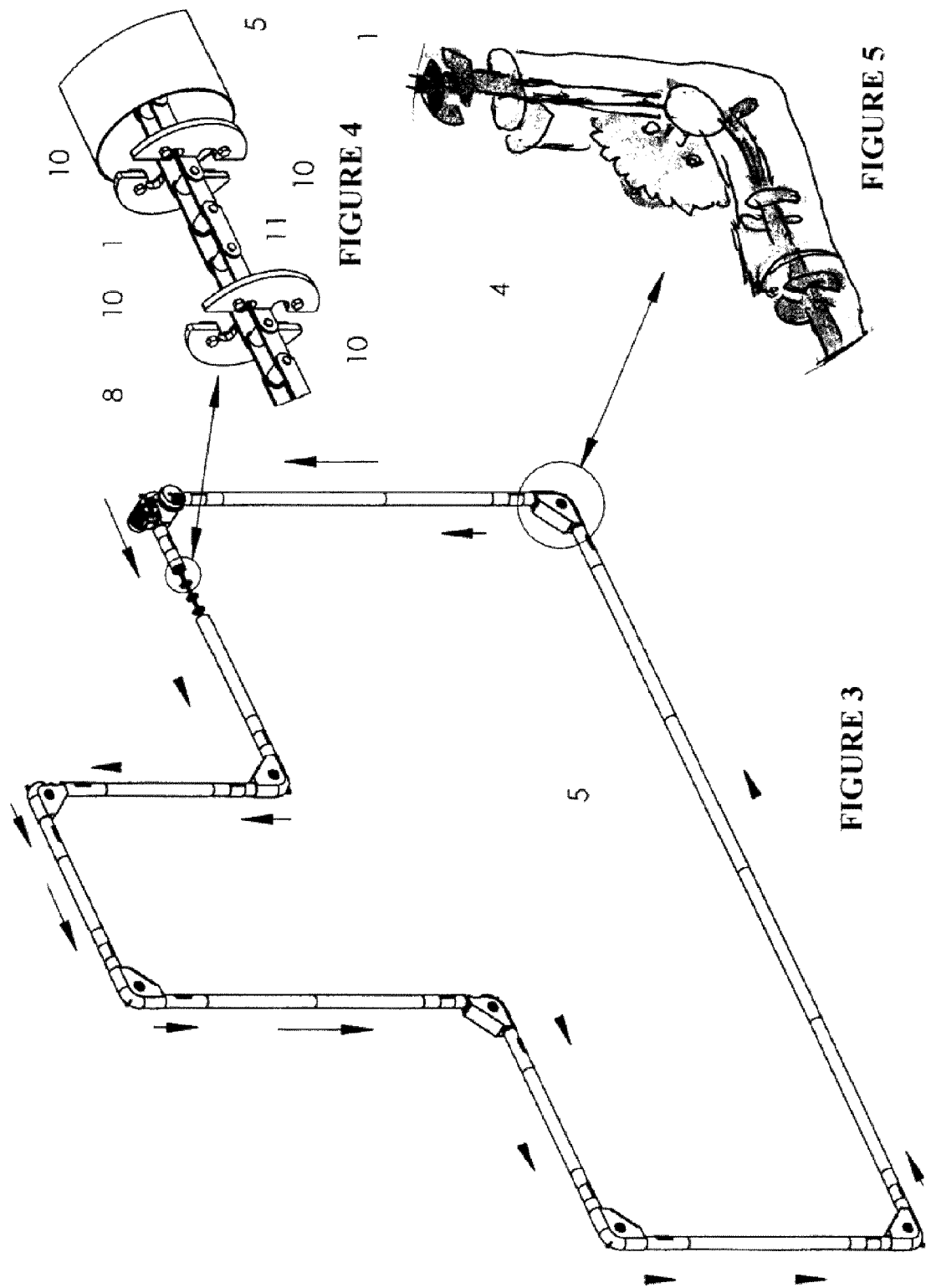

MADE TO A GRAIN CONVEYOR

This report for Utility Model refers to an improvement introduced in the configuration of drag plates sets installed on a conveyor of the redler type, using a closed circuit circular duct. This transportation system has been detailed in PI-03018032, which shows a "CONFIGURATION APPLIED TO GRAIN CONVEYOR", of the drag conveyor type for bulk products, more specifically used for handling vegetable grains and agriculture seeds, such as soy, corn, wheat, rice, oats, barley, coffee and other bulk products.

Its major application is for drying and warehousing facilities for grains, which use vertical circular silos, bulk warehouses and also other handling processes employed by agricultural properties, cooperatives, agro-industries and similar industrial facilities.

Conveyors of the redler type comprise a conveyor chain (1) with some attachments (2) along its extension, where the drag plates are fixed (3), for the purpose of dragging the products inside the circular duct (5) along the closed circuit route. Upon operating the chain on sprocket wheels (4), positioned at the points where the direction changes, these plates (3) will allow the chain to engage (1) with the sprocket wheel (4) allowing the transmission of movement between the driving system and the chain, the changes of direction and the use of tightening mechanisms or tighteners.

In conventional conveyors, the technique using drag plates (3), which assembly and details are shown in FIG. 1, comprises a plate (3), that is generally made of plastic material, with characteristics suitable for this application, with emphasis on the UHMW (ultra-high molecular weight polyethylene), but not limited to this material. FIG. 2 shows a front view of the drag plate (3), having as major characteristic a format close to the circular section of the conveyor duct (5), which has a radial opening (6) that allows the chain to engage the teeth of the sprocket wheels (4). This drawing shows a limiting characteristic, when it is necessary to reverse the direction of the transportation. Conventional conveyors change the direction only to one side, as shown by the arrows in FIG. 1 of this report, i.e., as can be seen from a lateral view of the sprocket wheel, along the extension of the circuit, the changes of direction always occur to the same side, in this case, clockwisely. Using this type of drag plate, (3), a reversion of the direction would be impossible, as the contact on the other side of the chain with a sprocket wheel, would show the interference of the broad part (7) of the plate (3). Further, the number of drives used in a conventional conveyor, is generally limited to just the two gears positioned in the upper corners, therefore limiting the total installed power capacity and consequently, the conveyor's size or capacity. For the system currently developed, each change of direction will have a drive, therefore allowing the increase of the installed power capacity and enabling the use of larger conveyors. The change of directions at angles other than 90 degrees, also results in benefits for the performance of more complex uses and a better adaptation to different types of application.

The improvement made to the conveyor comprises a new drawing of the drag plates that allows the reversing of the direction changes of the conveyor chain in such a way that, the sprocket wheels may be used on both sides of the chain along the extension of the circuit. This feature enables a conveyor performance that offers different configurations as its major benefit, reducing even more the quantity of material used to manufacture the drag plates.

For better clarification, the detailed descriptive report below refers to the following drawings:

FIG. 1: a schematic view of a typical conveyor circuit of a conventional system, showing enlarged details of a curve with the major components of a dragging group.

FIG. 2: shows the front view of a conventional drag plate, mounted on the chain inside the duct.

FIG. 3: shows a perspective drawing of a type of conveyor developed with plates and attachments.

FIG. 4: shows details of an open section of a conveyor, showing the components of the dragging group.

FIG. 5: shows enlarged details with some components removed in order to allow a view of one of the curves showing the chain passing through the sprocket wheel.

Figure 6:
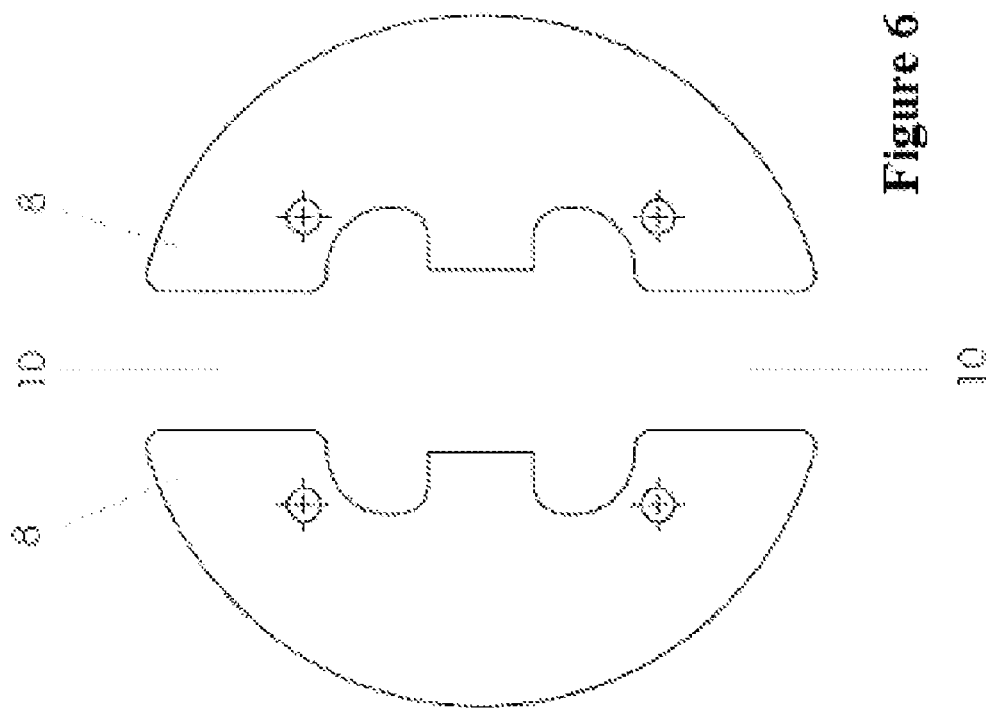

FIG. 6: shows a front view of a pair of drag plates

FIG. 7: shows a perspective view of the chain with attachments

Figure 8:
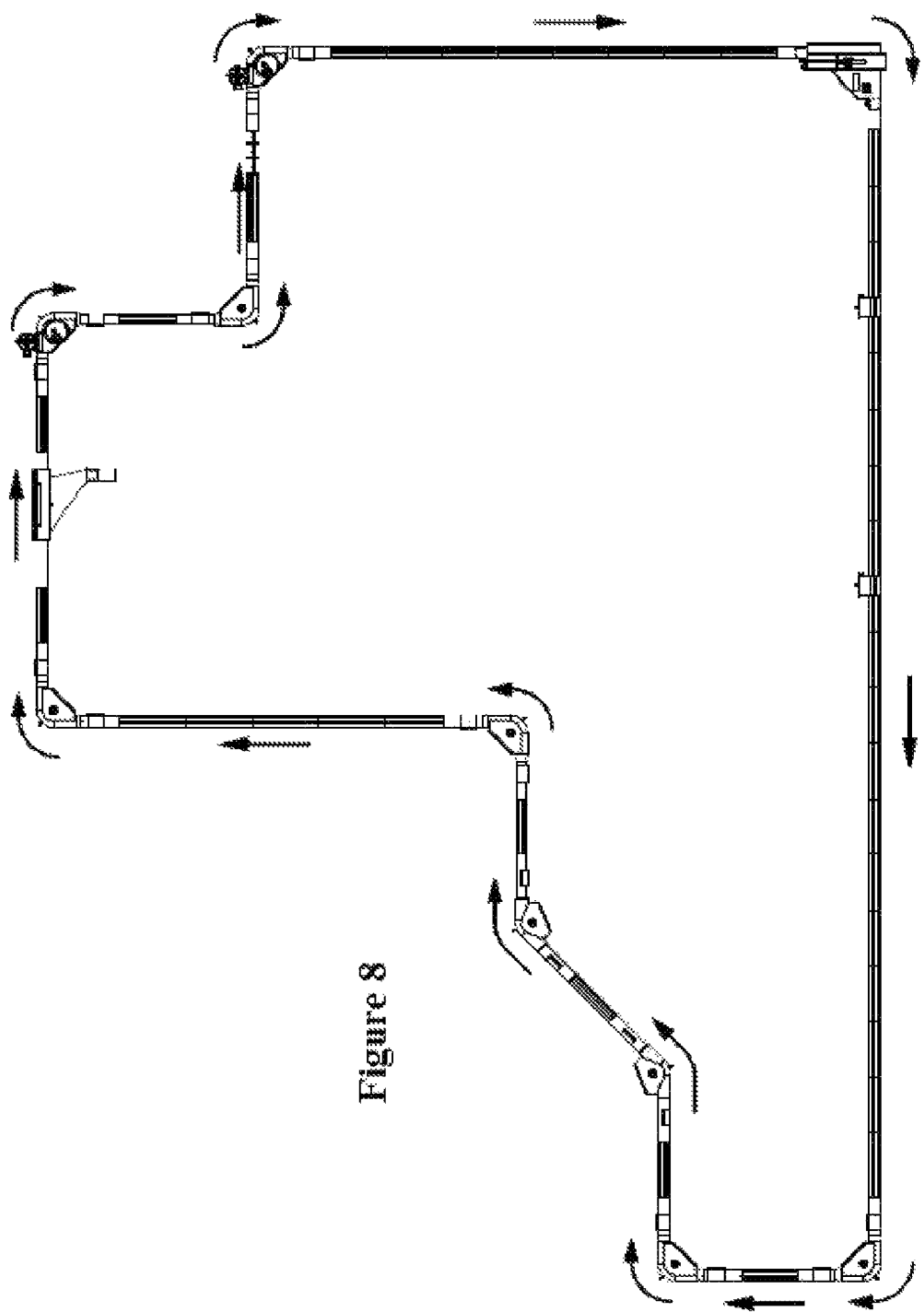
Figure 9:
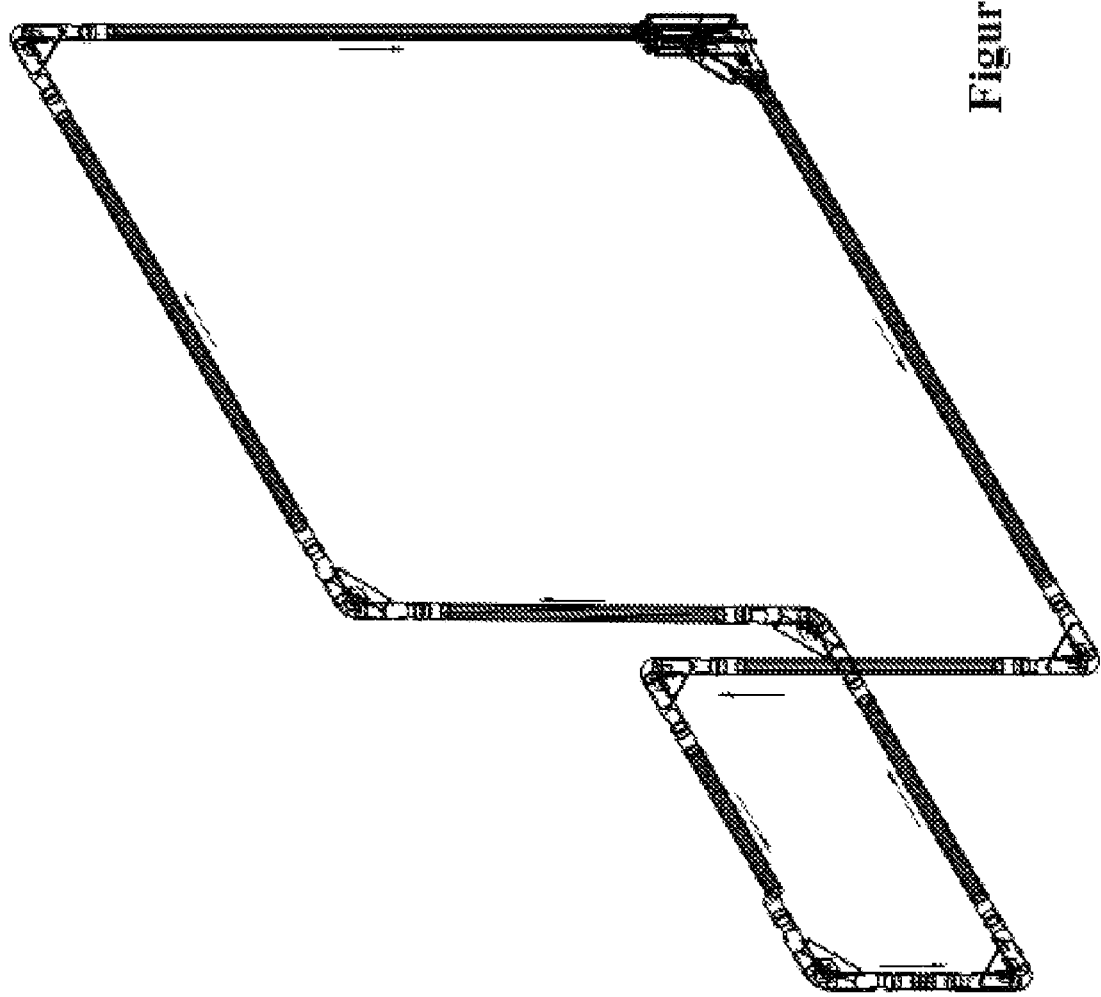

FIGS. 8 and 9 show a schematic view of some configurations, with emphasis on reverse or bilateral changes of directions.

The new configuration comprises two independent drag plates (8), forming a pair, symmetrically assembled on the attachments (9) of the conveyor chain (1).

The outlying format of the drag plates (8) is similar to a semicircle with an outer diameter smaller than the internal diameter of the duct (5), forming two gaps or openings (10) in relation to an imaginary axis passing through the center of the semicircles—FIG. 6. These gaps correspond to the thickness of the sprocket wheel (4), in addition to necessary lateral clearances, in such a way that, the plates (8) bilaterally mounted on the chain (1), allow a free movement and due engaging of the chain with the sprocket wheel (4) on both sides, i.e., the upper and lower sides of the chain.

Each plate is individually fixed to the corresponding attachment (9) by means of setscrews (11). Therefore, each dragging group comprises two drag plates (8), mounted on the external plates with the attachments (9), and, at regular intervals, along the extension of the conveyor chain (1). This new drawing corresponds to a format similar to "D" profiles, different from the conventional model, which comprises just one piece, with a geometry similar to a "U" format. Upon operating the conveyor, the openings (10) allow a partial filling factor in the duct section (5), that controls possible overloads and dragging of the particulate material. Dynamically, extensive linear sections of the chain may suffer random torsions that may vary the position of the openings (10) in relation to the vertical position of the axis of symmetry.

Some differential in behavior between the individual and the double drag plates may be noticed, particularly in the areas close to the gears, upon changing directions. The "U" shaped plates (3) would have different dragging areas if positioned with the opening turned upwards or downwards, depending on the conveyor's section, due to a greater volume of grains in the lower part of the duct. The new plates (8) show the same dragging area at any point of the conveyor.

FIGS. 8 and 9 show a side view of different configurations for a continuous conveyor forming closed circuits, with reverse change of directions. The arrows indicating the movements show that changes occur once to the right and then to the left, enabling clockwise and anti-clockwise flows, as well as turns of the sprocket wheel, in the same closed circuit.

These configurations enlarge the scope of projects and solutions for transportation facilities. This flexibility is very interesting, as the objective and differential of this type of conveyor is the ability to transport between different processing points, warehousing, loading and unloading points of a system using just one conveyor.

FIG. 8 shows a configuration of the a ladder type conveyor, where different levels may be designated to conveyor horizontal sections, allowing loading at different levels and even, the possibility of deviating from obstacles.

The use of curves or change of directions, at angles other than ninety degrees—FIG. 8—is facilitated by flexible practical applications.

FIG. 9 shows another example of a circuit configuration, showing a "loop" format, as indicated by the arrows, emphasizing the possibility of changing directions, using the same conveyor, clockwisely and anti-clockwisely.

Application in modular assemblies, expanding or reducing the conveyor may be provided, since a variable number of drives can be used for changing directions along the circuit extension. Less material will be used to manufacture the plates if the area used is also reduced, making it more economic and in the event, it is necessary to replace a damaged plate, it will also be more economic.

The invention claimed is:

1. A device comprising: A tubular conveyor throughout its extension, wherein the transport is done by means of a roll chain (1) composed by metal plates with back reinforcements (9) and carrying plates made of UHMW (8) located peripherally near a semicircle or profiles in "D" in opposition originating central spaces or openings (10) and clockwise and anti-clockwise changes, in the same plane, formed by corners provided with indented wheels (4).

2. A device comprising: a grain conveyor with two independent drag plates (8), forming a pair, symmetrically assembled on the attachments (9) of a conveyor chain (1) with the outlying format of the drag plates (8) is similar to a semicircle with an outer diameter smaller than the internal diameter of a duct (5), forming two gaps or openings (10) in relation to an imaginary axis passing through the center of the semicircles with the gaps correspond to the thickness of a sprocket wheel (4) that is attached to said conveyor chain, with the plates (8) bilaterally mounted on the conveyor chain (1), allowing for a free movement and engaging of the chain with the sprocket wheel (4) on the upper and lower sides of the chain.

3. A device according to claim 2 further comprising: having each plate is individually fixed to the corresponding attachment (9) by means of setscrews (11).

4. A device according to claim 2 further comprising: enabling clockwise and anti-clockwise flows.

5. A device according to claim 2 further comprising: enabling turns of the sprocket wheel in a closed circuit.

* * * * *